April 22, 1924.

S. BOGNAR 1,491,580

TEMPERATURE GAUGE FOR SADIRONS

Filed April 6, 1923

Inventor
S. Bognar

By J. K. Bryant
Attorney.

Patented Apr. 22, 1924.

1,491,580

UNITED STATES PATENT OFFICE.

SANDOR BOGNAR, OF ITHACA, NEW YORK.

TEMPERATURE GAUGE FOR SADIRONS.

Application filed April 6, 1923. Serial No. 630,297.

*To all whom it may concern:*

Be it known that I, SANDOR BOGNAR, a citizen of Hungary, residing at Ithaca, in the county of Tompkins and State of New York, have invented certain new and useful Improvements in Temperature Gauges for Sadirons, of which the following is a specification.

This invention relates to certain new and useful improvements in temperature gauges for sad irons and has particular reference to a thermostatically operated indicator for determining the temperature of the iron, allowing the supply of electric current to be cut off and preventing the overheating of the iron.

The primary object of the invention is to provide a temperature gauge for sad irons wherein a thermostatically operated indicator arm is disposed within a socket or cavity formed in the body of a sad iron with the indicator arm being clearly viewable through a glass plate disposed at the upper side of the iron body.

With the above and other objects in view as the nature of the invention is better understood, the same consists of the novel form, combination and arrangement of parts hereinafter more fully described, shown in the accompanying drawing and claimed.

Figure 1:
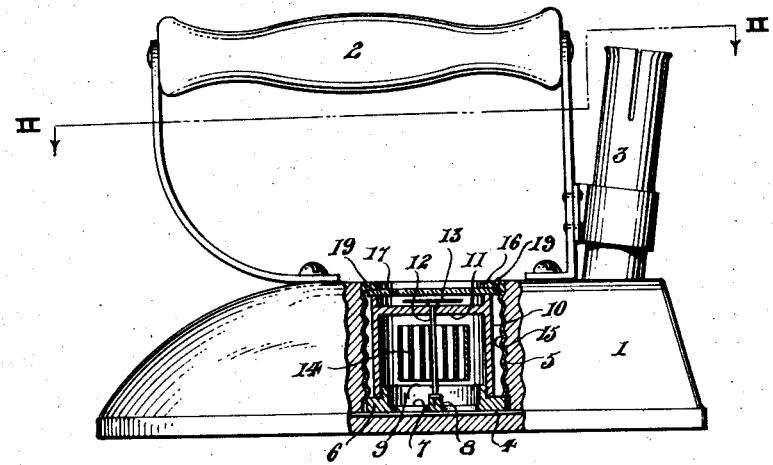
Figure 2:
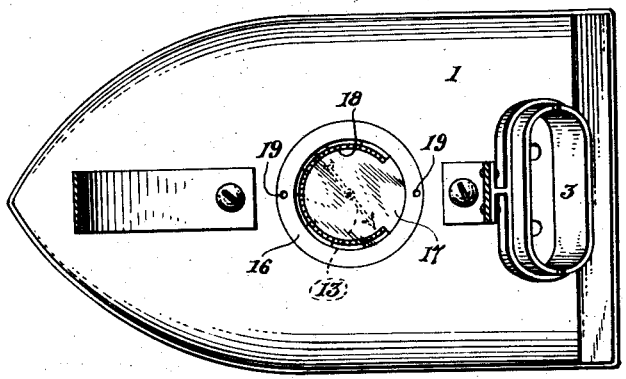
Figure 3:
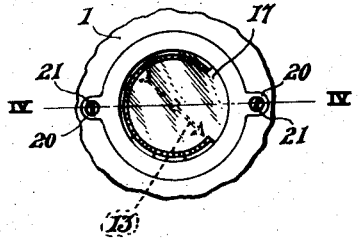
Figures 4, 5:
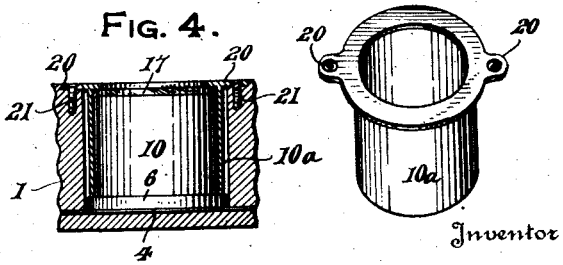

In the drawing, wherein like reference characters designate corresponding parts throughout the several views, Figure 1 is a side elevational view, partly broken away and shown in section of a sad iron constructed in accordance with the present invention and equipped with the improved temperature gauge, Figure 2 is a horizontal sectional view taken on line II—II of Fig. 1, Figure 3 is a fragmentary top plan view of a modified form of the invention, Figure 4 is a detail sectional view taken on line IV—IV of Fig. 3, and Figure 5 is a perspective view of the retaining sleeve shown in Figs. 3 and 4 for the temperature gauge.

Referring more in detail to the accompanying drawings, there is illustrated a temperature gauge for electrically heated sad irons, the iron body 1 being provided with the usual handle 2 and carrying a socket 3 and a conduit plug that is placed in circuit with the resistance element 4.

The central portion of the body 1 is provided with an internally threaded socket 5 opening at the upper end of the body 1, the resistance element 4 extending across the bottom of the socket as shown in Fig. 1. A bearing plate in the form of a ring 6 carries centrally positioned spider bars 7 having their crossed points provided with a bearing stud 8 while the ring 6 adjacent the inner edge thereof carries an upwardly directed annular flange 9.

The temperature gauge includes a sleeve 10 having a centrally apertured cross wall 11 adjacent its upper end, an indicator shaft 12 being journaled in the aperture of the wall 11 and carrying an indicator hand 13 upon its upper end. A coiled thermostatic element 14 encloses the indicator shaft 12, being anchored at one of its ends to said shaft and at its other end to the sleeve 10. In placing the temperature gauge in the socket 5, the lower end of the sleeve 10 frictionally encloses the flange 9 of the ring 6 as shown in Fig. 1 with the lower end of the indicator shaft 12 extending into the stud 8 of the spider bars 7.

To retain the temperature gauge in its operative position, a screw sleeve 15 is threaded into the socket 5 and the inwardly flanged upper end 16 thereof engages the glass cover plate 17 for the temperature gauge that is positioned on the upper edge of the sleeve 10, the glass plate being graduated as at 18, as shown in Fig. 2. The lower end of the threaded sleeve 15 engages the ring 6 for rigidly mounting the ring and temperature gauge in the socket 5, the flange 16 of the threaded sleeve being provided with diametrically opposite openings 19 to be engaged by a spanner wrench for adjusting the same.

From the above detail description of the device, it is believed that the construction and operation thereof will at once be apparent, it being noted that the heat in the socket 5 will effect the thermostatic element 14 for shifting the indicator arm 13 for registering the exact temperature of the sad iron.

A modified form of the anchoring means for the temperature gauge is shown in Figs. 3 to 5, the sleeve 10ᵃ carrying diametrically opposite outwardly directed ears 20 that receive fastening devices 21 entering the body portion 1 of the iron.

While there are herein shown and described the preferred embodiments of the present invention, it is nevertheless to be understood that minor changes may be made therein without departing from the spirit and scope of the invention as claimed.

What is claimed as new is:—

1. In a device of the class described, a sad iron having a socket therein, a vertical indicator shaft rotatable in the socket, an indicator arm carried by the upper end of the shaft, a thermostatic element associated with the indicator shaft, a sleeve inclosing the shaft, a graduated transparent plate supported on the upper end of the sleeve above the indicator arm, and means for retaining the sleeve and plate in the socket.

2. In a device of the class described, a sad iron having a socket therein, a vertical indicator shaft rotatable in the socket, an indicator arm carried by the upper end of the shaft, a thermostatic element associated with the indicator shaft, a sleeve inclosing the shaft, a graduated transparent plate supported on the upper end of the sleeve above the indicator arm, and a sleeve threaded into the socket inclosing the first named sleeve and engaging the upper end thereof for anchoring the same in the socket.

3. In a device of the class described, a sad iron having a socket therein, a vertical indicator shaft rotatable in the socket, an indicator arm carried by the upper end of the shaft, a thermostatic element associated with the indicator shaft, a sleeve inclosing the shaft, a graduated transparent plate supported on the upper end of the sleeve above the indicator arm, a sleeve threaded into the socket inclosing the first named sleeve and engaging the upper end thereof for anchoring the same in the socket, and a bearing for the lower ends of the first named sleeve and indicator shaft.

In testimony whereof I affix my signature.

SANDOR BOGNAR.